United States Patent
Yamamoto et al.

(10) Patent No.: US 7,341,243 B2
(45) Date of Patent: Mar. 11, 2008

(54) LIQUID-SEALED VIBRATION CONTROL DEVICE

(75) Inventors: Hikofumi Yamamoto, Osaka (JP); Yoshio Ihara, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 86 days.

(21) Appl. No.: 10/527,800

(22) PCT Filed: Nov. 7, 2003

(86) PCT No.: PCT/JP03/14231

§ 371 (c)(1), (2), (4) Date: Mar. 15, 2005

(87) PCT Pub. No.: WO2004/051113

PCT Pub. Date: Jun. 17, 2004

(65) Prior Publication Data
US 2006/0163784 A1   Jul. 27, 2006

(30) Foreign Application Priority Data
Nov. 29, 2002 (JP) ............................. 2002-347813

(51) Int. Cl.
*F16F 5/00* (2006.01)
(52) U.S. Cl. .................. 267/140.13; 248/638
(58) Field of Classification Search .......... 267/140.13, 267/140.11, 140.12; 248/560, 636, 638
See application file for complete search history.

(56) References Cited

U.S. PATENT DOCUMENTS

| | | | | |
|---|---|---|---|---|
| 4,762,310 A | * | 8/1988 | Krajewski et al. | 267/141.2 |
| 6,257,562 B1 | * | 7/2001 | Takashima et al. | 267/141.1 |
| 6,505,822 B1 | * | 1/2003 | Yamamoto et al. | 267/140.13 |
| 6,517,061 B2 | * | 2/2003 | Yamamoto et al. | 267/140.11 |
| 2006/0097436 A1 | * | 5/2006 | Yamamoto | 267/140.12 |

FOREIGN PATENT DOCUMENTS

| | | |
|---|---|---|
| JP | 57-37113 | 3/1982 |
| JP | 4-114145 | 10/1992 |
| JP | 5-10839 | 2/1993 |
| JP | 5-50201 | 7/1993 |
| JP | 6002735 | 1/1994 |
| JP | 6249282 | 9/1994 |
| JP | 6-300079 | 10/1994 |
| JP | 6-78645 | 11/1994 |
| JP | 8-2104289 | 8/1996 |

(Continued)

*Primary Examiner*—Melody M. Burch
(74) *Attorney, Agent, or Firm*—Westerman, Hattori, Daniels & Adrain, LLP.

(57) ABSTRACT

In a hydraulic style vibration-proof device, a lower attachment fitting (34) forming an air chamber (36) between a diaphragm (16) and itself is fabricated of aluminum and is provided at its bottom wall portion with a through-hole (50), and a bolt (52) having a serration portion (54) below its head is press fitted in and secured to the through-hole, thereby fixedly providing the bolt (52) without involving a large projection into the air chamber (36) and at a low cost Further, the bottom wall portion (34B) is formed to be thicker than a peripheral wall portion (34C) of the lower attachment fitting and both are interconnected by a curved portion (34D), thereby achieving an increase in strength.

7 Claims, 6 Drawing Sheets

FOREIGN PATENT DOCUMENTS

| | | |
|---|---|---|
| JP | 2568225 | 1/1998 |
| JP | 1194015 A * | 4/1999 |
| JP | 2001020992 | 1/2001 |
| JP | 2001173689 | 6/2001 |
| JP | 2002-13583 | 1/2002 |
| JP | 2003083391 | 3/2003 |

* cited by examiner

LIQUID-SEALED VIBRATION CONTROL DEVICE

TECHNICAL FIELD

This invention relates to a hydraulic style (liquid-filled type) vibration-proof device.

BACKGROUND ART

Hitherto there are proposed a variety of structures for vibration-proof devices, e.g., a mount for supporting a vibrating object such as an automotive engine so as not to transmit its vibrations to a support body such as a car body.

For example, JP Utility Model Registration No. 2568225 discloses a hydraulic style vibration-proof device which comprises an upper attachment fitting to be attached to a vibrating object side and a cylindrical fitting to be attached to a support body side, both connected through a vibration-isolating base made of rubber elastomer, a diaphragm opposing the vibration-isolating base and situated on the lower side of the cylindrical fitting thus defining a liquid chamber internally enclosed between the vibration-isolating base and the diaphragm, a partition member having an orifice dividing the liquid chamber vertically, and a cup-shaped lower attachment fitting attached to a lower end opening of the cylindrical fitting thereby forming an air chamber between itself and the diaphragm.

At the lower attachment fitting, a bolt projecting downwardly is provided to install and fix it to the support body side. According to the aforementioned Reference, it is proposed to provide a bolt having a serration portion below its head so as to be pierced through the lower attachment part by press fitting and concurrently, with a view to ensuring air tightness of the air chamber, to fill the clearance gap between the head of the bolt and the lower attachment fitting and the clearance gap of the pierced part with an anaerobic dimethacrylate resin.

In this prior art vibration-proof device, for the lower attachment fitting attached to the cylindrical fitting, an iron press formed product is employed. That is, heretofore a serration bolt has been press fitted into the lower attachment fitting made of iron whereby the bolt has been seated firmly. Of late years, a low fuel consumption to automobiles is strongly demanded and accordingly, a request to weight reduction of automotive parts from automobile manufacturers is severer day by day. Under the circumstances, the vibration-proof device using the aforementioned iron-made lower attachment fitting is unable to meet sufficiently the request to weight reduction.

As a weight reducing means it is conceivable to replace iron of the lower attachment fitting with aluminum, but in that case if the structure of the iron-made lower attachment fitting is adopted directly for that of an aluminum-made one, then a problem will be caused in that the press fitted part of the bolt comes short of strength.

Figure 6:
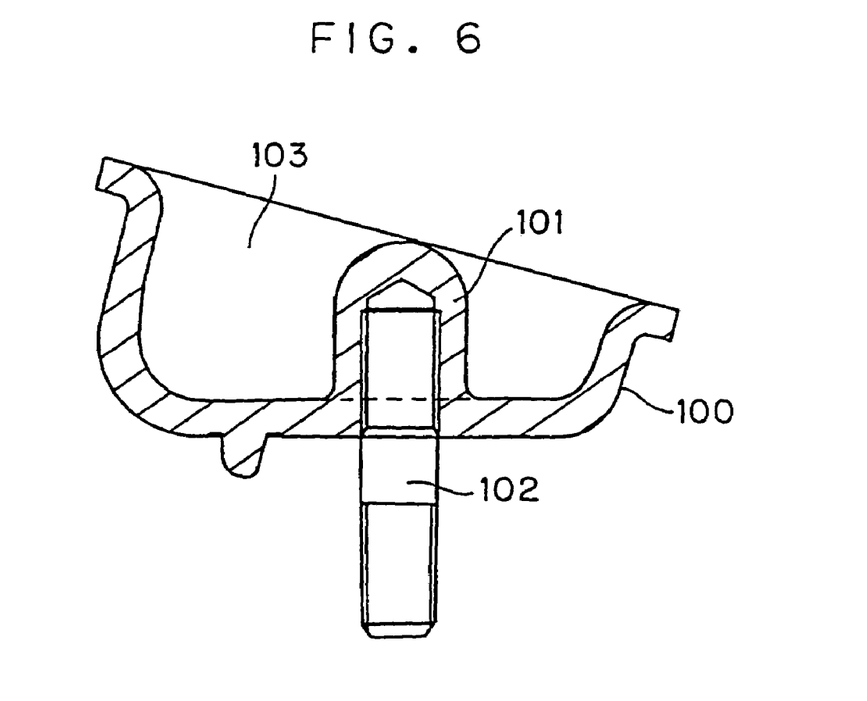
FIG. 6 is a sectional view of a conventional lower attachment fitting.

To cope with the problem, such a structure is conceivable that as shown in FIG. 6, an aluminum-made lower attachment fitting 100 is formed, at its bottom wall, with a female screw part 101 projecting upwardly and a stud bold 102 is embedded in the female screw part 101 or a normal bolt although not depicted, is used for fastening to the female screw part from the car body side. However, in this case, since the female screw part 101 is made of aluminum, it is necessitated to make its mating length to the bolt large for the purpose of ensuring the strength and consequently, the female part 101 projects largely within an air chamber 103, as a result of which a problem of interference to a diaphragm located above it arises.

Figure 7:
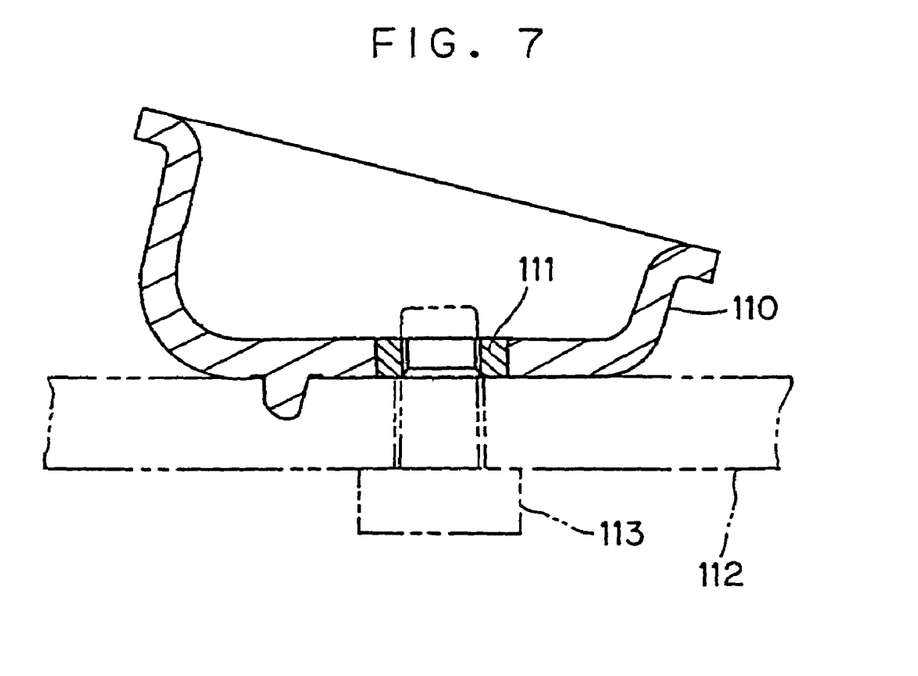
FIG. 7 is a sectional view of another conventional lower attachment fitting.

Further such a structure is also conceivable that as shown in FIG. 7, an iron-made female screw part 111 is integrally formed at the bottom wall of an aluminum-made lower attachment part 110 by insert forming and a normal bolt 113 is used for fastening to the female screw part 111 from the car body 112 side or a stud bold is embedded in the female screw part, although not shown. However, the problem here is that the insert forming leads to an increase in cost.

In JP Patent Application Publication No. 1994-2735 A, a structure of aluminum-made lower attachment fitting is illustrated, wherein a bottom wall part thereof is partly thickened and a serration bolt is provided securely at the thick-walled portion so as to project downwardly. However, with that structure as disclosed in the Reference, the bottom wall part and a peripheral wall part of the lower attachment fitting are directly connected in the absence of any curving bent part smoothly linking between the bottom wall part and the peripheral wall part, although the corner parts are formed in a somewhat rounded form. Moreover the thickness from the bottom wall part to the peripheral wall part is gradually decreased only and a sufficient thickness at the boundary of the bottom wall part and the peripheral wall part is not necessarily secured. As a consequence, stress generated by excessive load input to the vibration-proof device cannot be effectively absorbed and accordingly, a problem in the aspect of strength is worried about

DISCLOSURE OF THE INVENTION

In view of the problems described above, the present invention has been made, and accordingly, it is an object of the invention to provide a hydraulic style vibration-proof device being lightweight and having a sufficient strength by providing an aluminum-made attachment fitting fixedly with a bolt securely at a low cost without involving a significant projection within an air chamber.

The hydraulic style vibration-proof device according to this invention is directed to such that comprises a cylindrical fitting, a first attachment fitting, a vibration-isolating base made of rubber elastomer connecting an upper end opening of the cylindrical fitting and the first attachment fitting, a diaphragm disposed to oppose the vibration-isolating base and forming a liquid chamber within the cylindrical fitting between the diaphragm and the vibration-isolating base, and a cup-shaped second attachment fitting attached to a lower end opening of the cylindrical fitting and forming an air chamber between the second attachment fitting and the diaphragm, wherein the aforesaid second attachment fitting is made of aluminum and includes a peripheral wall portion, a bottom wall portion formed to be thicker than the peripheral wall portion, and a curved portion interposed between the peripheral wall portion and the bottom wall portion and curved in an arc form in axial cross-section, the bottom wall portion being defined with a through-hole, and a bolt having a serration portion below its head is press-fitted in the through-hole and provided fixedly to the second attachment fitting, projecting downwardly thereof.

This invention has enabled for the first time a practicable fixing installment of the serration bolt to the aluminum-made second attachment fitting by press-fitting operation, and thereby it is feasible to provide the bolt at a low cost without involving a significant jutting of the bolt or the like within the air chamber. Because the second attachment fitting is thus made of aluminum, it is also possible to make the vibration-proof device significantly light-weight as compared with conventional products made of iron.

Further according to this invention, because the second attachment fitting is formed in a manner that the bottom wall portion provided with the through-hole is formed to be thicker in wall thickness than the peripheral wall portion, it is possible to ensure the strength of its press-fitted part by the bolt. Moreover because the second attachment fitting is formed to extend from the peripheral wall portion via the arc-like curved portion to the thick-walled bottom wall portion, it is possible to ensure a high strength also to a stress acting due to load input to the vibration-proof device.

In the vibration-proof device of the invention described above, the thickness of the second attachment fitting is preferred to be gradually increased from the bottom wall portion toward the curved portion, where a maximum is reached, and gradually decreased from there to the peripheral wall portion. By making the curved portion linking the bottom wall portion and the peripheral wall portion thick-walled in this manner, it is possible to ensure a yet higher strength to a stress due to the load input mentioned above. Such thickness variation was unable to impart with any conventional iron press-formed articles, and now is possible to impart for the first time by adopting aluminum material as in this invention. Thus it is feasible to achieve simultaneously the strength and weight reduction.

Further in the vibration-proof device of this invention, the upper end opening surface of the second attachment fitting may slant relative to the bottom wall portion whereby the peripheral wall portion is formed at different heights in the circumferential direction such that at a higher place of the peripheral wall portion, a corresponding place of the curved portion is formed to be thicker in thickness. In that case, since the moment is higher at the higher place of the peripheral wall portion, it is possible to achieve an efficient increase in strength by making the thickness of the corresponding place of the curved portion thicker at that place of higher height.

In the present invention, it is also possible to fill a sealing agent between the bolt and the second attachment fitting thereby to enhance the air-tightness of the air chamber.

Again in this invention, it is preferred to provide a non-serration bonding portion at a lower end of the inner peripheral wall surface of the through-hole between the surface and the bolt. In the case where the second attachment fitting is made of aluminum, burrs are likely to be produced when the serration bolt is press fitted. The burrs appear from the underside of the through-hole when the serration portion bites into the inner wall surface of the through-hole due to the fact that the inner wall surface of the through-hole is shaved. Because of softer aluminum than iron, the burrs are more likely to be produced, and in particular where the bottom wall portion is thick-walled for securement of strength, the burrs are further more liable to be produced. On the contrary, where the non-serration bonding portion is provided internally at the lower end of the through-hole as described above, the shavings of the through-hole are absorbed by that portion whereby it is possible to suppress the production of the burrs toward outside.

As an expedient of providing such a non-serration bonding portion, the length of the serration portion may be set shorter than the depth of the through-hole, thus ensuring the non-serration bonding portion between the lower end of the serration portion and the lower end opening surface of the through-hole, or the lower end opening edge may be chamfered, thus providing the non-serration bonding portion.

In the present invention, assuming the outside diameter of the serration portion to be a (mm), the aperture diameter of the through-hole to be b (mm), and the axial length of the bonded part of the serration portion to the through-hole to be c (mm), it is preferred that the bonding index d of the bolt defined by the formula given below be 3 and upwards (more preferably 5 and upwards):

$$d=(a/b) \times c.$$

Thereby it is possible to ensure a sufficient strength when the serration bolt is press fitted and anchored to the aluminum-made second attachment fitting.

BEST MODE FOR CARRYING OUT THE INVENTION

The vibration-proof device relating to one embodiment of this invention will be hereinafter described with reference to the accompanying drawings.

Figure 1:
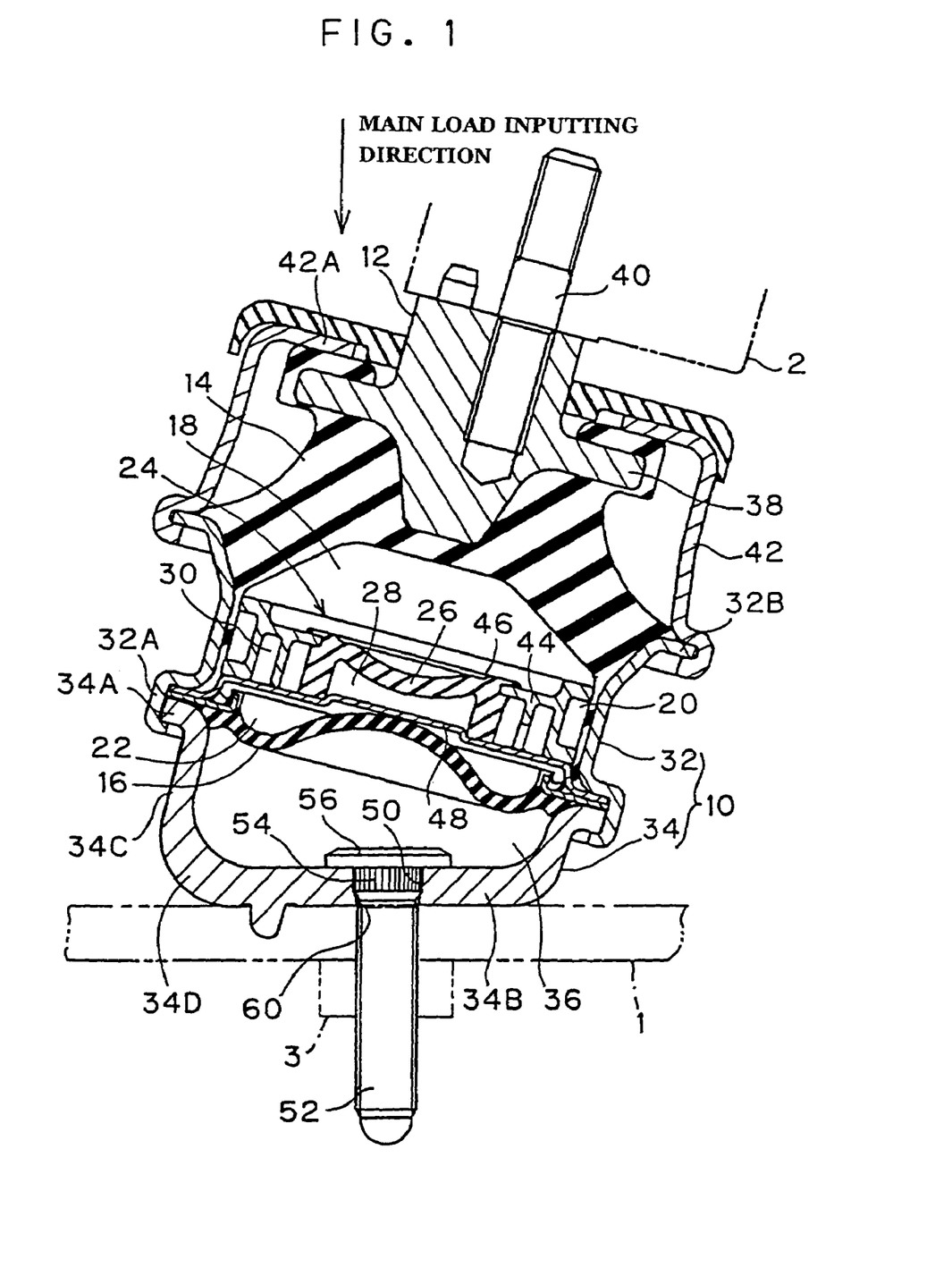
FIG. 1 is a longitudinal sectional view of a hydraulic style vibration-proof device relating to an embodiment of this invention.

The vibration-proof device in this embodiment is an engine mount supporting an automotive engine to the car body. It is a liquid-filled type vibration-proof device which comprises a main body fitting 10 to be attached to a horizontal member 1 of the car body; an upper attachment fitting (first attachment fitting) 12 to be attached to a bracket 2 of the engine; a vibration-isolating base 14 made of rubber elastomer interposed between the main body fitting 10 and the upper attachment fitting 12 to absorb and isolate the vibration from a vibrating body; a first diaphragm 16 opposing the vibration-isolating base 14 and axially spaced apart a distance therefrom; a main liquid chamber 18, whose chamber wall is partly formed by the vibration-isolating base 14 between the vibration-isolating base 14 and the first diaphragm 16 and which is sealed with liquid; a subsidiary liquid chamber 22, which is brought into communication with the main liquid chamber 18 through a first orifice 20 and sealed with liquid similarly to the main liquid chamber 18 and whose chamber wall is partly separated and formed by the first diaphragm 16; a partition member 24 separating the main liquid chamber 18 and the subsidiary liquid chamber 22; a third liquid chamber 28 which is situated inside the partition member 24 and whose chamber wall is partly separated and formed by a second diaphragm 26 to the main liquid chamber 18; and a second orifice 30 bringing the third liquid chamber 28 and the subsidiary liquid chamber 22 into communication with each other.

The main body fitting 10 includes a cylindrical fitting 32 made of iron assuming a generally short cylinder form and a cup-shaped lower attachment fitting (a second attachment fitting) 34 fixed to a lower end opening thereof. An opening edge 34A at an upper end of the lower attachment fitting 34 splays outwardly in a flange form and is fastened at a lower end opening edge 32A of the cylindrical fitting 32 together with the first diaphragm 16 and the partition member 24 by crimping so as to be encapsulated, whereby the cylindrical fitting 32 and the lower attachment fitting 34 are coupled to each other. Thus the first diaphragm 16 and the partition member 24 are seated inside the main body fitting 10 while an air chamber 36 is formed between the lower attachment fitting 34 and the first diaphragm 16.

The upper attachment fitting 12 is of aluminum die casting product and provided with a flange 38 for stopper projecting radially outwardly and embedded in an upper zone of the vibration-isolating base 14 by vulcanization molding means. At the upper attachment fitting 12, there is provided fixedly a stud bolt 40 for attachment to a bracket 2 on the engine side.

The vibration-isolating base 14 assumes a nearly umbrella shape, with its lower end attached to the upper end opening of the main body fitting 10 by vulcanization bonding means. The cylindrical fitting 32 is provided at its upper end opening with a flange portion 32B, to which a cylindrical stopper fitting 42 surrounding the outer periphery of the vibration-isolating base 14 is fixed by crimping fastening. The stopper fitting 42 is fashioned of an aluminum press-formed product and configured, with its upper end portion 42A bent to be directed inwardly so as to perform a stopper action against a large displacement in the vertical direction of the upper attachment fitting 12.

The partition member 24 is made up of an aluminum-made annular orifice-forming member 44 defined with a first and a second orifices 20, 30, a liquid chamber-forming member 46 made of rubber forming the second diaphragm 26 and the third liquid chamber 28 in a central area of the orifice-forming member 44, and a partition-bearing plate 48 provided in contact with undersides of the members 44, 46 and obstructing undersides of the second orifice 30 and the third liquid chamber 28 to compart between the third liquid chamber and the subsidiary liquid chamber 22. The second orifice 30 assumes, in its external contour, an annular double-winding form, when viewed in plan, whereas the first orifice 20 is formed of part of the annulus, when viewed in plan, at an outer periphery of the second orifice 30.

In this embodiment thus constituted, the lower attachment fitting 34 is fashioned of an aluminum die casting. More specifically, it is fabricated by laminar flow die casting in order to suppress the production of cavity (blow-hole) due to complicated configuration. Here, the laminar flow die casting means a die casting method, wherein a molten liquid is cast slowly and finally a high pressure is applied to densify the casting texture.

Figure 2:
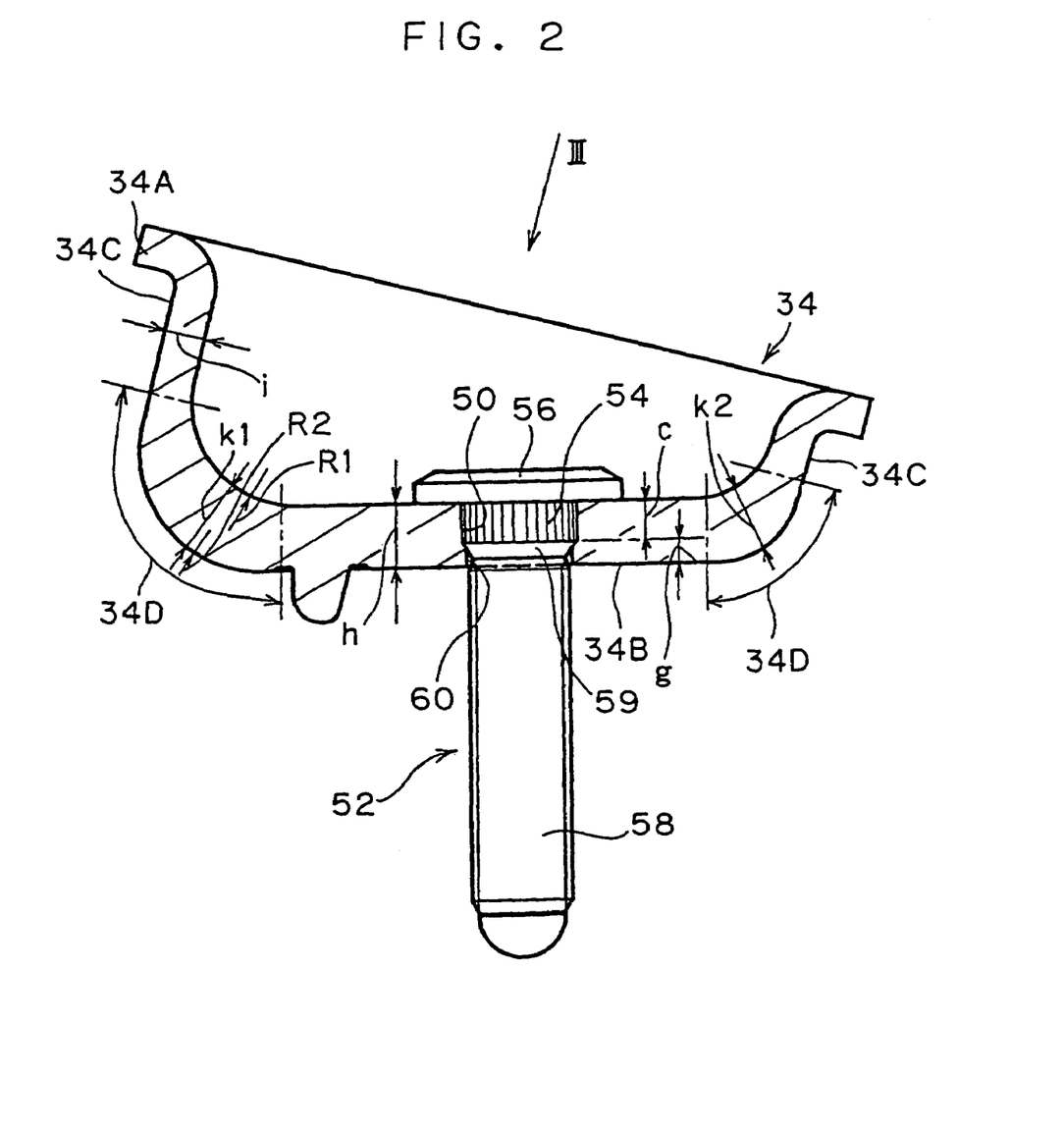
FIG. 2 is a sectional view of a lower attachment fitting of the vibration-proof device above (in cross-section taken along II-II line in FIG. 3)

As shown in FIG. 2 in an enlarged scale, the lower attachment fitting 34 includes a bottom wall portion 34B, a peripheral wall portion 34C, and a curved portion 34D interposed between the bottom wall portion 34B and the peripheral wall portion 34C and curved in an arc form when viewed in axial cross-section (a plane cut in a plane including the axis), the peripheral wall portion 34C being curved at its upper end with the upper end opening edge 34A.

Figure 3:
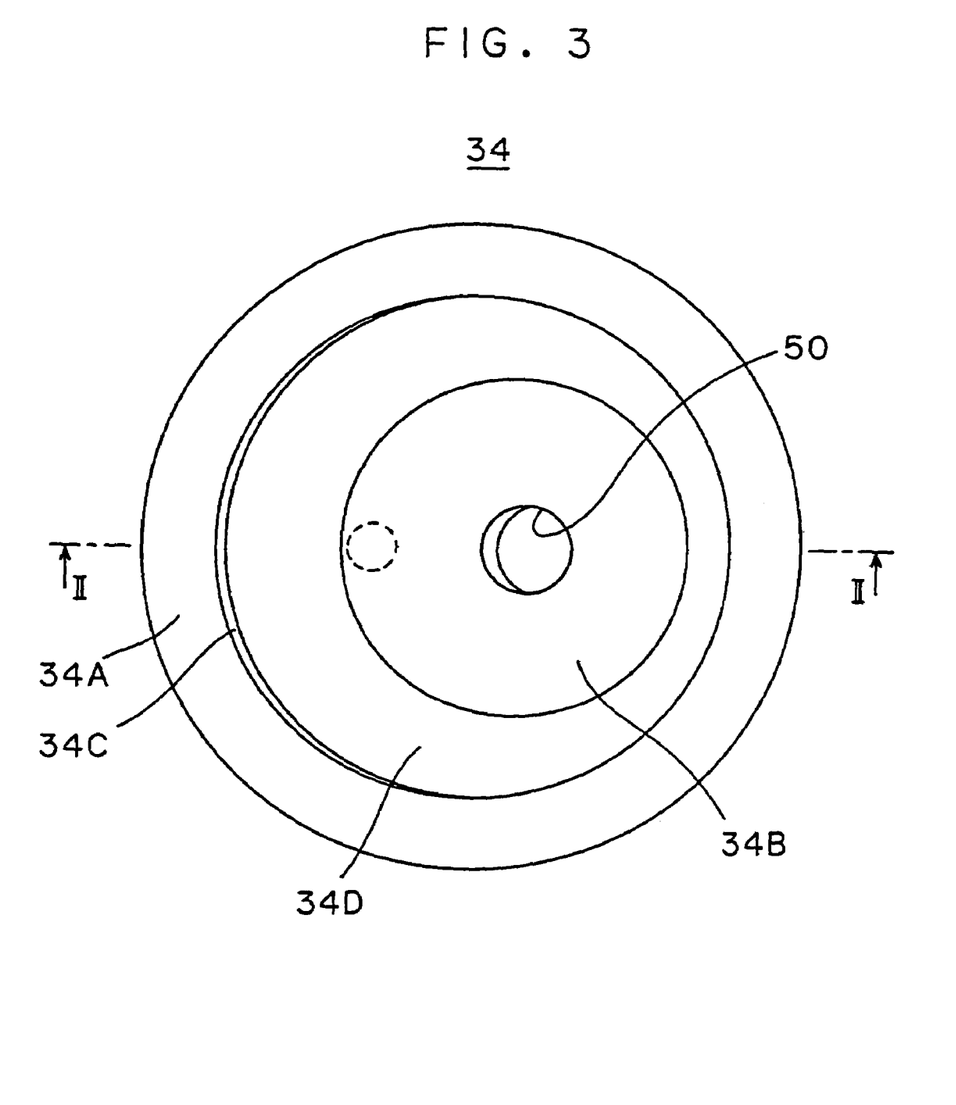
FIG. 3 is a plan view of the lower attachment fitting when viewed from III direction in FIG. 2.

The bottom wall portion 34B assumes, as illustrated in FIGS. 2 and 3, a disc form of a constant plate thickness, and the thickness h of the bottom wall portion 34B is, over the entirety thereof, formed to be thicker than the thickness i of the peripheral wall portion 34C for the purpose of ensuring the strength. The thickness relation of the both is not particularly limited, but preferred to be in the relation of $h \geq 1.5\, i$.

The curved portion 34D extends to be bent in an arc form from the bottom wall portion 34B to the peripheral wall portion 34C, thereby linking the bottom wall portion 34B and the peripheral wall portion 34C in a gently-sloping curved form. The thickness of the lower attachment fitting 34 is preset to take a maximum value at the curved portion 34D in such a manner that it is gradually increased from the bottom wall portion 34B until reaching the maximum at the curved portion 34D and then gradually decreased up to the peripheral wall portion 34C. The thickness at the curved portion 34D is obtained by a thickness dimension in the vertical direction to a tangential line of an inner arc in the cross-sectional form shown in FIG. 2

Further in this embodiment, the upper end opening face (face formed by the upper end opening edge 34A) of the lower attachment fitting 34 slants obliquely to the bottom wall portion 34B being horizontal, whereby the peripheral wall portion 34C is formed at different heights in the circumferential direction. And at a higher location of the peripheral wall portion 34C, the thickness at a corresponding location of the curved portion 34D is set to be thicker. More specifically, the height of the peripheral wall portion takes a maximum in the left part of FIG. 2 and a minimum in the right part of FIG. 2, and accordingly, the thickness of the curved portion 34D in the circumferential direction takes the maximum at k1 in the left part and the minimum at k2 in the right part in FIG. 2.

The inner radius of curvature R1 and the outer radius of curvature R2 of the curved portion 34D are made to be nearly the same value. In one example of the embodiment, the inner radius of curvature R1 is 13 mm in the left part and 8 mm in the right part in FIG. 2, and is varied gradually between both. On the other hand, the outer radius of curvature R2 is 15 mm in the left part and 10 mm in the right part in FIG. 2, and is varied gradually between both.

As shown in FIG. 2, the bottom wall portion 34B is provided with a through-hole 50 of a simple round hole, and a bolt 52 is securely provided through the through-hole 50, jutting out downwardly. The bolt 50 is a serration bolt having a serration portion 54 below its head. When the bolt is press fitted in the through-hole 50, the serration portion 54 bites into the inner wall surface of the through-hole 50, and thereby the bolt is secured to the lower attachment fitting 34.

Figure 4:
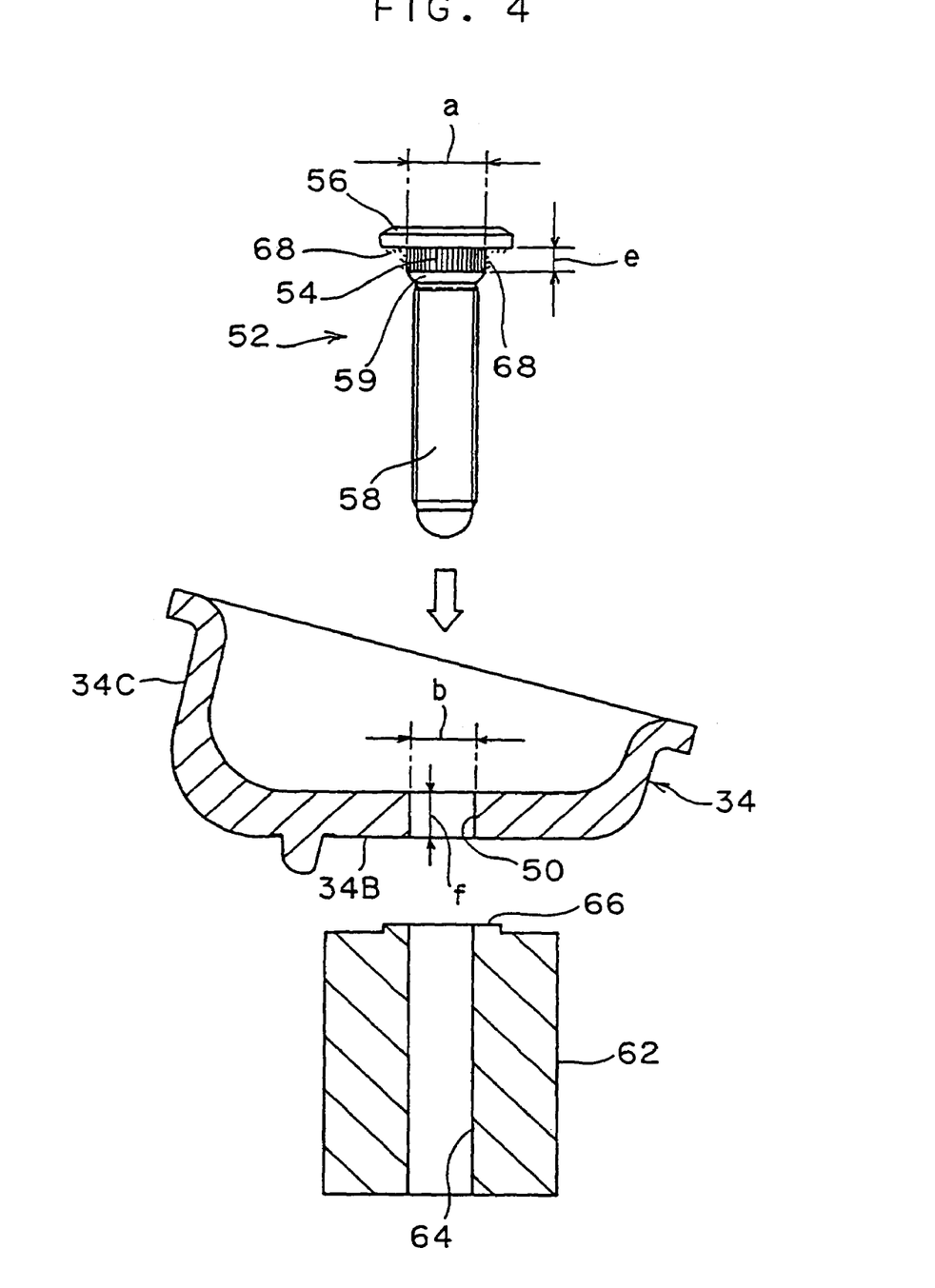
FIG. 4 is a sectional view showing the step when a bolt is press fitted in the lower attachment fitting.

Specifically stated, the bolt 52 is provided, between the head 56 which is flat and has a large diameter and a male screw portion 58, with the serration portion 54 having a slightly smaller diameter than the male screw portion 58, wherein between the serration portion 54 and the male screw portion 58 there is interposed a tapered surface 59. The serration portion 54 is provided with a plurality of axially extending protruding streaks in the circumferential direction by applying knurling working to its outer periphery. As illustrated in FIG. 4, the axial length e of the serration portion 54 is set to be shorter than the depth f of the through-hole 50. Further as shown in FIG. 2, at the lower end of the inner wall surface of the through-hole 50, more particularly between the lower end of the serration portion 54 and the lower end opening surface of the through-hole 50 upon press fitting, a non-serration bonding portion 60 is ensured. The axial length of the non-bonding portion 60 is preferred to be 1.5 mm or above, more preferably 2 mm or above.

Further in order to ensure the fixing strength of the bolt 52, assuming the outside diameter of the serration portion 54 to be a (mm), the aperture diameter of the through-hole 50 to be b (mm) and the axial length of the bonding part of the serration portion 54 to the through-hole 50 to be c (mm), a bonding index d of the bolt defined by the formula given below is preferred to be 3 and upwards, more preferably 5 and upwards:

$$d=(a/b) \times c$$

In one example of this embodiment, since a=13.5 mm, b=12.7 mm, c=5.0 mm are set, d=5.3 is obtained, and accordingly, a sufficient fixing strength is ensured. The inside diameter of the serration portion 54 is set to be the same as the aperture diameter of the through-hole 50, namely 12.7 mm.

When the bolt 52 is press fitted in the lower attachment fitting 34, as shown in FIG. 4, the bottom face of the lower attachment fitting 34 is rested on a coining jig 62, and the bolt 52 is press fitted from upwardly into the through-hole 50. The coining jig 62 assumes a cylinder shape having a hollow part 64 conforming to the through-hole 50 and is provided, at its upside receiving the lower attachment fitting 34, with a raised part 66 which protrudes at the opening edge of the hollow part 64 slightly above its periphery. The bolt 52 is press fitted while forcing to apply this raised part 66 around the through-hole 50 of the lower attachment fitting 34. During press fitting, the serration portion 54 is received into the through-hole 50 while the plural projecting streaks thereof shave the inner wall surface of the through-hole because the serration portion 54 is harder in hardness than the lower attachment fitting 34, and the bolt is thus fixed. At that time, due to the provision of the non-serration bonding portion 60 at the lower end of the through-hole 50 as stated above, the non-bonding portion can absorb the shavings thereby to restrain the production of burrs outside the through-hole 50.

As illustrated in FIG. 4, the bolt 52 to be press fitted is preliminarily coated, on the back surface of the head 56 and the serration portion 54, with a sealing agent 68 by dry coating or baking processing. The bolt 52 coated with the sealing agent is press fitted, whereby the sealing agent 68 is filled in the clearance gap between the bolt 52 and the through-hole 50 and the clearance gap between the bolt head 56 and the lower attachment fitting 34, so that sealing properties at the press-fitted part are ensured. Preferred as the sealing agent 68 is anaerobic dimethacrylate resin, whose one example is "Roctite 202" (trade name), etc. manufactured by Nippon Roctite Co.

The vibration-proof device in this embodiment thus constructed is, as shown in FIG. 1, installed, with the upper attachment fitting 12 attached securely to a bracket 2 on the engine side with the bolt 40 upwardly projecting and the lower attachment fitting 34 attached securely to a car body 1 with the bolt 52 downwardly projecting using a nut 3.

Under working conditions of the vibration-proof device so installed, vibrations from the engine side are propagated via the upper attachment fitting 12 to the vibration-isolating base 14, attendant with which the vibration-isolating base 14 is vibrated or deformed to absorb or intercept the vibrations and concurrently, the vibrations are shut down also at the main liquid chamber 18, the subsidiary liquid chamber 22, the third liquid chamber 28 and the orifices 20, 30. In this case, a main load inputting direction is as shown in FIG. 1.

Specifically stated, as to engine idling vibrations, first, against a vibration in a low frequency region on the order of 5 Hz corresponding to rotational ½ order (half order) vibration of the engine, the liquid existing in the main liquid chamber 18 is flowed through the first orifice 20 to the subsidiary liquid chamber 22. By reason of a fluidization resistance of the liquid within the first orifice 20, a predetermined damping force is exhibited to suppress the rotational ½ order vibration of the engine. Against another rolling vibration of the engine in a frequency region on the order of 15 Hz, the second diaphragm 26 facing the main liquid chamber 18 is oscillated, in response to which the liquid within the third liquid chamber 28 is flowed via the second orifice 30 to the subsidiary liquid chamber 22 side. By this fluidization action of the liquid within the second orifice 30, a high damping force is obtained to the frequency of the order of 15 Hz, whereby the engine rolling vibration is dampened.

On the other hand, as to shake vibration which comes into question during running of the vehicle, the cycle of the engine shake vibration is in the range of 10 to 15 Hz and consequently, the shake vibration is damped by damping force mainly based on the fluidization action of liquid within the second orifice 30.

According to the vibration-proof device in this embodiment thus constructed, the serration bolt 52 is press fitted in the lower attachment fitting 34 made of aluminum to be provided fixedly, whereby it is possible to provide the bolt 52 at a low cost without involving a significant projection in the air chamber 36. Further because the bottom wall of the lower attachment fitting 34 is formed to be thick-walled, the strength of the press-fitting part is ensured. The occurrence of burring upon press fitting is also suppressed.

Again in the lower attachment fitting 34 made of aluminum, the bottom wall portion 34B and the curved portion 34D, on which both a large stress acts due to load input, are formed to be thick-walled, and hence a sufficient strength can be ensured. In particular, because the arc-like curved portion 34 D is interposed between the peripheral wall portion 34C and the bottom wall portion 34B, a sufficient thickness can be ensured also in the curved portion 34D. Further the thickness of the curved portion 34D is set to be thicker at a place where the peripheral wall portion 34C is located higher, whereby it is possible to achieve an efficient increase in strength to accommodate the magnitude of moment.

Figure 5:
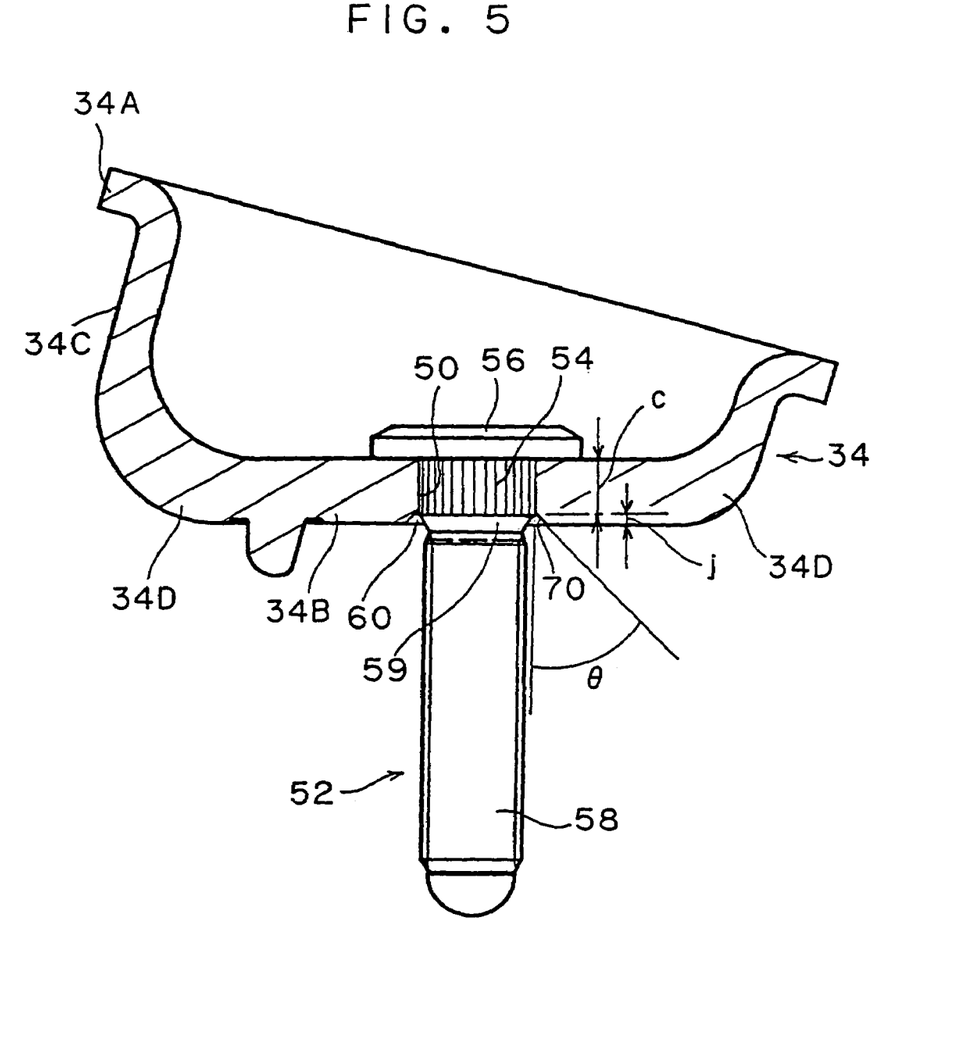
FIG. 5 is a sectional view showing a variation example of the lower attachment fitting.

FIG. 5 is a variation example wherein the embodiment as described above is modified as to the construction of press-fitting part. In this example, the lower end opening edge of the through-hole 50 is chamfered. More specifically, the through-hole 50 is, as shown, cut out at its lower end opening at its edge angle so that the lower end opening may be extended in a reverse tapered form, and a chamfered portion 70 in the form of a slanting face is formed. By chamfering in this manner, the non-serration bonding portion 60 is ensured at the lower end of the inner wall surface of the through-hole 50. The other construction than the above is similar to that of the foregoing embodiment and further description will be omitted.

By providing the chamfered portion 70 as in this example, even in the case where the axial length c of the serration portion 54 is so brig that the nonbonding portion 60 having a sufficient length below the serration portion cannot be provided, it is possible to restrain the production of burrs outside the through-hole 50. The chamfering angle theta (θ) is preferred to be in the neighborhood of 45 degrees, and the axial length j of the chamfered portion 70 is preferably 1.5 mm or above, more preferably 2 mm or above.

In the embodiment described above, the vibration-proof device of a double-orifice structure having two orifices has been exemplified, and yet this invention is also applicable similarly to an vibration-proof device of a single-orifice structure. The invention is further applicable to such type of vibration-proof device that is mounted on a vehicle with the upper attachment fitting and the lower attachment fitting turned upside down.

INDUSTRIAL APPLICABILITY

According to this invention, it is possible to provide fixedly the bolt to an aluminum-made attachment fitting at a low cost without involving a large projection in the air chamber and hence the invention makes it possible to contribute to a weight reduction of hydraulic type vibration-proof devices.

The invention claimed is:

1. A hydraulic style vibration-proof device comprising:
a cylindrical fitting;
a first attachment fitting;
a vibration-isolating base made of rubber elastomer coupling an upper end opening of the cylindrical fitting and the first attachment fitting;
a diaphragm disposed to oppose the vibration-isolating base and forming a liquid chamber between the vibration-isolating base and the diaphragm within the cylindrical fitting;
and a cup-shaped second attachment fitting disposed below said diaphragm and attached to a lower end opening of the cylindrical fitting, forming an air chamber between the second attachment fitting and the diaphragm,
wherein said second attachment fitting is fabricated from aluminum and includes a peripheral wall portion, a bottom wall portion formed to be thicker in wall thickness than the peripheral wall portion and a curved portion interposed between the bottom wall portion and the peripheral wall portion and curved in an arc form in axial cross-section;
wherein the bottom wall portion is defined with a through-hole and has a bolt having a serration portion below its head press-fitted in the through-hole and provided fixedly to the second attachment fitting in such a manner that the bolt juts out from the second attachment fitting downwardly,
wherein a thickness of the second attachment fitting is gradually increased from the bottom wall portion toward the curved portion until reaching a maximum at the curved portion and then gradually decreased to the peripheral wall portio, and
wherein a plane of the upper end opening of the second attachment fitting slants relative to the bottom wall portion in a manner such that the peripheral wall portion is formed at different heights in the circumferential direction and at a higher location of the peripheral wall portion, a thickness at a corresponding location of the curved portion is thicker.

2. The hydraulic style vibration-proof device as set forth in claim 1, wherein a sealing agent is filled between the bolt and the second attachment fitting.

3. The hydraulic style vibration-proof device as set forth in claim 1, wherein an inner wall surface of the through-hole is, at its lower end, provided with a non-serration bonding portion between the inner wall surface and the bolt.

4. The hydraulic style vibration-proof device as set forth in claim 3, wherein a length of the serration portion is set to be shorter than a depth of the through-hole, thus providing the non-serration bonding portion between the serration portion and a lower end opening face of the through-hole.

5. The hydraulic style vibration-proof device as set forth in claim 3, wherein the lower end opening face of the through-hole is chamfered at its edge to provide the non-serration bonding portion.

6. The hydraulic style vibration-proof device as set forth in claim 1, wherein a bonding index d of the bolt is defined by the formula given below:

$$d = (a/b) \times c$$

wherein an outside diameter of the serration portion is a (mm), an aperture diameter of the through-hole is b (mm) and an axial length of a bonding portion of the serration portion to the through-hole is c (mm), and wherein the bonding index d of the bolt is at least 3.

7. The hydraulic style vibration-proof device as set forth in claim 6, wherein the bonding index d of the bolt is at least 5.

* * * * *